United States Patent [19]

Heinz et al.

[11] Patent Number: 4,645,785

[45] Date of Patent: Feb. 24, 1987

[54] THERMOPLASTIC POLYOXYMETHYLENE MOLDING MATERIALS HAVING HIGH ABRASION RESISTANCE

[75] Inventors: Gerhard Heinz, Weisenheim; Wilhelm Schüette, Speyer; Georg N. Simon, Limburgerhof, all of Fed. Rep. of Germany

[73] Assignee: BASF Aktiengesellschaft, Fed. Rep. of Germany

[21] Appl. No.: 795,127

[22] Filed: Nov. 5, 1985

[30] Foreign Application Priority Data

Nov. 14, 1984 [DE] Fed. Rep. of Germany ....... 3441546

[51] Int. Cl.$^4$ ................................................ C08K 5/34
[52] U.S. Cl. .................................... 524/100; 524/456; 524/593
[58] Field of Search .................. 524/100, 456, 593

[56] References Cited

U.S. PATENT DOCUMENTS 4,394,468  7/1983  Lu ........................................ 524/593
4,506,053  3/1985  Sakurai et al. ...................... 524/593
4,517,319  5/1985  Reske et al. ........................ 524/456

FOREIGN PATENT DOCUMENTS 1006190  11/1965  United Kingdom .

OTHER PUBLICATIONS

Patent Abstracts of Japan, vol. 1, No. 17, p. 887C76 (Mar. 23, 1977) corresponding to JP-A No. 51/131556 (Asahi Kasei Kogyo) of Nov. 16, 1976.
Patent Abstracts of Japan, vol. 1, No. 75, p. 1456C76 (Jul. 19, 1977) corresponding to JP-A No. 51/145550 (Asahi Kasei Kogyo) of Dec. 14, 1976.

*Primary Examiner*—Lewis T. Jacobs
*Attorney, Agent, or Firm*—Keil & Weinkauf

[57] ABSTRACT

Thermoplastic polyoxymethylene molding materials having high abrasion resistance contain
(A) from 4 to 94.7 parts by weight of polyoxymethylene,
(B) from 5 to 50 parts by weight of wollastonite,
(C) from 0.2 to 5 parts by weight of N-hydroxymethylmelamines in which some or all of the hydroxymethyl groups are etherified with alkanols,
(D) from 0.1 to 5 parts by weight of a silicone oil having a degree of polycondensation n of from 10 to 5,000 and/or
(E) from 0.1 to 10 parts by weight of polyethylene and/or copolymers of ethylene and α-olefins having a molecular weight of from 100,000 to 1,000,000, the number of parts by weight of components A, B, C, D and E summing to 100, with or without
(F) effective amounts of additives.

4 Claims, No Drawings

THERMOPLASTIC POLYOXYMETHYLENE MOLDING MATERIALS HAVING HIGH ABRASION RESISTANCE

It is known that polyoxymethylenes can be provided with additives in order to improve certain physical properties of the polyoxymethylenes and to extend their range of possible uses. German Laid-Open Application DOS No. 2,319,353 has disclosed that polyoxymethylenes can be provided with wollastonite as a reinforcing filler, without the concomitant use of coupling components, in order to increase the rigidity of the thermoplastic molding material. Furthermore, European Patent Application No. 19,761 discloses that alkoxymethylmelamines are added to thermoplastic molding materials of polyoxymethylenes and glass fibers. These mixtures have a number of advantageous properties, such as high tensile strength, flexural strength, impact resistance, dimensional stability and modulus of elasticity. However, they are unsatisfactory for fields of use where high abrasion resistance is required. To increase the latter, polytetrafluoroethylene has been added to polyoxymethylene molding materials. For example, German Published Application DAS No. 1,569,243 discloses that as much as 40% by weight of polytetrafluoroethylene fibers are added to polyoxymethylene molding materials. Apart from the fact that a relatively large amount of polytetrafluoroethylene has to be added in order to achieve adequate abrasion resistance, molding materials of this type are unsatisfactory. Moreover, they release toxic gases at high temperatures, for example in the event of a fire.

It is an object of the present invention to provide thermoplastic polyoxymethylene molding materials which possess good mechanical properties, such as tensile strength, flexural strength and modulus of elasticity, and furthermore have high abrasion resistance and do not release any toxic constituents at high temperatures.

We have found that this object is achieved by thermoplastic polyoxymethylene molding materials having high abrasion resistance, which contain (A) from 40 to 94.7 parts by weight of a polyoxymethylene,
(B) from 5 to 50 parts by weight of wollastonite,
(C) from 0.2 to 5 parts by weight of N-hydroxymethylmelamine in which some or all of the hydroxymethyl groups are etherified with alkanols,
(D) from 0.1 to 5 parts by weight of a silicone oil having a degree of polycondensation n of from 10 to 5,000 and/or
(E) from 0.1 to 10 parts by weight of polyethylene and/or copolymers of ethylene with α-olefins having a molecular weight of from 100,000 to 1,000,00, the number of parts by weight of components A, B, C, D and E summing to 100, with or without (F) effective amounts of additives.

The novel molding materials have the advantage of possessing good mechanical properties, such as tensile strength, flexural strength, dimensional stability and modulus of elasticity, and furthermore having excellent abrasion resistance. In the event of fire, they do not release any corrosive or toxic gases.

Suitable polyoxymethylenes (component A) are homopolymers of formaldehyde or copolymers of formaldehyde and of trioxane with cyclic and/or linear formals, such as butanediol formal or epoxides, such as ethylene oxide or propylene oxide. As a rule, the homopolymers have thermally stable terminal groups, such as ester or ether groups. The copolymers of formaldehyde or of trioxane advantageously contain more than 50%, in particular more than 75%, of oxymethylene groups. Copolymers which have proven particularly useful are those which contain not less than 0.1% of comouomer groups which possess two or more adjacent carbon atoms in the chain. Polyoxymethylenes which contain from 1 to 10% by weight of comonomers have become particularly important industrially. Such copolymers can be obtained in a conventional manner by cationic copolymerization of trioxane with suitable comonomers, such as cyclic ethers or acetals, e.g. ethylene oxide, 1,3-dioxolane, 1,3-dioxane or 1,3-dioxyacylcycloheptene, or with linear oligoformals or polyformals, such as polydioxolane or polybutanediol formal. As a rule, the polyoxymethylenes used have a molecular weight $M_n$ of from $20 \times 10^2$ to $50 \times 10^3$ and an MFI at 190° C./21.17 N of from 2 to 50 according to DIN 53,735. Polymers composed of trioxane and from 1 to 10 mol% of butanediol formal have become particularly important. The novel molding materials contain from 40 to 94.7, in particular from 60 to 85, parts by weight of one or more polyoxymethylenes.

The molding materials according to the invention contain from 5 to 50, in particular from 10 to 30, parts by weight of wollastonite as component B. Wollastonite is an acicular calcium metasilicate, and the material generally used has a particle size of from 1 to 10 um. The wollastonite used may furthermore be treated with silanes, e.g. γ-aminopropyltriethoxysilane.

The novel molding materials contain, as component C, from 0.2 to 5, in particular from 0.2 to 2, parts by weight of N-hydroxymethylmelamines in which some or all of the hydroxymethyl groups are etherified with alkanols.

Preferred melamines contain from 2 to 6 hydroxymethyl groups, some of which are etherified with $C_1$-$C_4$ alkanols. Particularly preferred melamines are those containing not less than 2, preferably not less than 4, hydroxymethyl groups, all of which are etherified with $C_1$-$C_4$-alkanols. Examples of suitable compounds are dimethoxymethylmelamine, diethoxymethylmelamine, triethoxymethylmelamine, tetramethoxymethylmelamine and tetrabutoxymethylmelamine. Tetramethoxymethylmelamine has proven particularly useful. The above melamine derivatives can be obtained in a conventional manner, as described in detail in Houben-Weyl, Methoden der organischen Chemie, 4th Edition, Volume XIII/1, page 368.

The molding materials contain, as optional component D, from 0.1 to 5, in particular from 0.5 to 2, parts by weight of silicone oil having a degree of polycondensation n of from 10 to 5,000. Suitable silicone oils are described, for example, by Walter Noll in Chemie und Technologie der Silicone, Verlag Chemie, 1968, pages 393–396. Examples of suitable siloxane compounds are those of the formula I

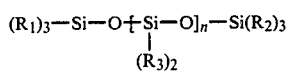

where $R_1$ and $R_2$ can be identical or different and are each $C_1$-$C_4$-alkyl or phenyl and $R_3$ is $C_1$-$C_4$-alkyl, phenyl or a radical of the formula $$-O-[Si-O]_n-R_1$$

where $R_1$ has the above meanings, and n is an integer from 0 to 50.

Alternatively, instead of component D, or in addition to it, the novel molding materials contain from 0.1 to 10, preferably from 0.5 to 5, parts by weight of polyethylene and/or copolymers of ethylene with α-olefins having a molecular weight of from 100,000 to 1,000,000. Suitable α-olefins are advantageously of 3 to 6 carbon atoms. Comonomers are advantageously present in amounts of from 1 to 15 mol%. High density or low density polyethylene is particularly preferably used.

The number of parts by weight of components A, B, C, D and E sum to 100.

The molding materials according to the invention may additionally contain effective amounts of additives (component F). Examples of additives are heat stabilizers, light stabilizers, lubricants, mold release agents, colorants, such as dyes and pigments, these being used in the conventional effective amounts. Other suitable additives are alkoxymethylureas, such as N,N-dimethoxymethylurea, N,N-diethoxymethylurea or N,N,N-trimethoxymethylurea, as well as glass fibers, and elastomeric polymers for improving the impact strength, e.g. urethane rubbers or graft rubbers based on polybutadiene or polyacrylates.

The novel thermoplastic molding materials are obtained by mixing the starting components by any conventional method in which essentially homogeneous mixing is achieved. For example, the components B to E can be mixed with the plastified polyoxymethylenes, for example in an extruder. It is also possible to mix the starting materials beforehand and to plastify the mixture in an extruder.

The novel polyoxymethylene molding materials are useful for producing moldings by injection molding or extrusion.

The Examples which follow illustrate the invention.

The abrasion resistance was determined using the test apparatus described in the thesis by Dipl.-Ing. Gunther Erhardt, University of Karlsruhe, 1980. The test pin made of polymer material is pressed against the rotating metal disk by means of a load produced by a weight. The metal disk has a certain roughness, and the wear of the polymer pin is expressed as the change in the length of the pin relative to the length of the friction path covered by the rotating disk at the height of the pin. This value is referred to as the frictional wear rate and has the dimension μm/km.

EXAMPLES 1 to 14

The components stated in the Table below were mixed in a twin-screw extruder at 200° C., the mixture was extruded and the extrudates were cooled and then comminuted. The pin required for the abrasion test was produced from the granules by injection molding and mechanical processing. The test was carried out at room temperature, using a steel disk having a roughness of from 2 to 2.8 μm. The pin was subjected to a pressure of 1 N/mm$^2$, and the rotational speed of the disk was 0.5 m/sec.

Examples 5, 10, 11 and 12 are according to the invention.

Examples 1 to 4, 6 to 9 and 13 and 14 are comparative examples.

TABLE

| Parts by weight | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| POM[1] | 100 | 99 | 79.5 | 89.75 | 88.75 | 95 | 95 | 97.5 | 97.5 | 87.25 | 87.25 | 86.25 | 99 | 80 |
| Wollastonite | — | — | 20 | 10 | 10 | — | — | — | — | 10 | 10 | 10 | — | — |
| Silicone oil[2] | — | 1 | — | — | 1 | — | — | — | — | — | — | 1 | — | — |
| Polyethylene[3] | — | — | — | — | — | 5 | 5 | 2.5 | 2.5 | 2.5 | 2.5 | 2.5 | — | — |
| Methoxymethyl-melamine[4] | — | — | 0.5 | 0.25 | 0.25 | — | — | — | — | 0.25 | 0.25 | 0.25 | — | — |
| PTFE | — | — | — | — | — | — | — | — | — | — | — | — | 1 | 20 |
| Abrasion rate pm/km | 50 | 36 | 19 | 12 | 5 | 8 | 8 | 17 | 17 | 8 | 3 | 2.5 | 50 | 2.5 |

[1]Polyoxymethylene and about 3% by weight of butanediol formal, MFI = 9 g/10 min at 190° C. and 21.17 N (DIN 53,735)
[2]Methylphenylpolysiloxane, kinematic viscosity at 20° C. = 500 mm$^2$/s
[3]Polyethylene, density 0.952, MFI = 2 g/10 min at 190° C. and 211.76 N (DIN 53,735)
[4]Tetramethoxyhexamethylolmelamine

We claim:

1. A thermoplastic polyoxymethylene molding material having high abrasion resistance, which comprises:
   (A) from 40 to 94.7 parts by weight of a poly oxymethylene,
   (B) from 5 to 50 part by weight of wollastonite,
   (C) from 0.2 to 5 parts by weight of N-hydroxymethylmelamines in which some or all of the hydroxymethyl groups are etherified with alkanols, and at least one of:
   (D) from 0.1 to 5 parts by weight of a silicone oil having a degree of polycondensation n of from 10 to 5,000 and
   (E) from 0.1 to 10 parts by weight of polyethylene and/or copolymers of ethylene and α-olefins having a molecular weight of from 100,000 to 1,000,000, the number of parts by weight of components A, B, C, D and E summing to 100.

2. The thermoplastic polyoxymethylene molding material of claim 1, wherein contains from 0.2 to 2 parts by weight of an N-hydroxymethylmelamine containing from 2 to 6 hydroxyl groups, some or all of which are etherified with $C_1$-$C_4$-alkanols.

3. The thermoplastic polyoxymethylene molding material of claim 1, which contains from 0.5 to 2 parts by weight of silicone oil.

4. The thermoplastic polyoxymethylene molding material of claim 1, which contains from 1 to 5 parts by weight of polyethylene.

* * * * *